March 15, 1966  M. GERSHON  3,240,011
STOP MEANS FOR SLIDE VALVES
Filed May 31, 1963
2 Sheets-Sheet 1

INVENTOR.
MILTON GERSHON
BY
AGENT

March 15, 1966  M. GERSHON  3,240,011
STOP MEANS FOR SLIDE VALVES
Filed May 31, 1963  2 Sheets-Sheet 2

INVENTOR.
MILTON GERSHON
BY
AGENT

United States Patent Office 3,240,011
Patented Mar. 15, 1966

3,240,011
STOP MEANS FOR SLIDE VALVES
Milton Gershon, Morristown, N.J., assignor to Thiokol Chemical Corporation, Bristol, Pa., a corporation of Delaware
Filed May 31, 1963, Ser. No. 284,684
7 Claims. (Cl. 60—35.6)

This invention relates generally to liquid propellant rocket power plants in which the flow of propellant fluid to the combustion chamber is controlled by a shear slide having two or more positions, and more particularly to a stop means for the shear slide in one of its positions which upon signal, is moved by the force supplied by the slide itself.

The propellant flow-controlling shear slide has two positions in a liquid propellant, single level thrust chamber of a rocket power plant and three positions in a two level thrust chamber. While the principles of the invention are applicable to the first or storage position of either, they are described and shown as applied to the second position of a two level thrust chamber.

The movement of the shear slide from storage position to that where the propellant ports are aligned for "boost" level operation is limited by a stop to ensure accurate alignment. When it is desired to change from "boost" level operation to "sustain" level, the stop is retracted so as to permit the shear slide to move to a third or final position defined by a thrust chamber shoulder, etc. so as to align the propellant ports for "sustain" level operation.

Various means have been utilized for retracting such shear slide stops and these have usually employed spring members of one type or another. Unfortunately in practice, these have proved to be unreliable in exerting the required forces to effect positive retraction of the stops so as to too often result in the failure of the rocket powerplant to ever attain "sustain" level operation, in a too rapid propellant consumption due to the prolonged "boost" level operation, and in a rocket powerplant performance far below that for which it was designed.

Accordingly, the main object of the present invention is to provide an improved shear slide stop means for liquid propellant rocket powerplant which obviates the above and other disadvantages of the stop means of known prior devices.

An important object of the present invention is to provide an improved stop for the shear slides of liquid propellant rocket powerplants which may be readily retracted to permit movement of the slide.

A further important object of the present invention is to provide an improved stop means for the shear slides of liquid propellant rocket powerplants in which the forces required to effect retraction of the stop are supplied by the shear slide itself.

Another important object of the present invention is to provide an improved stop means for the shear slides of rocket engines which may be readily installed in existing rocket powerplants with a minimum of change thereto and which will be simple of construction, strong and rugged in operation, and susceptible of ready and economic manufacture and installation.

Other objects and advantages of the invention will become apparent during the course of the following description.

In the drawings I have shown one embodiment of the invention. In this showing:

Figure 1:
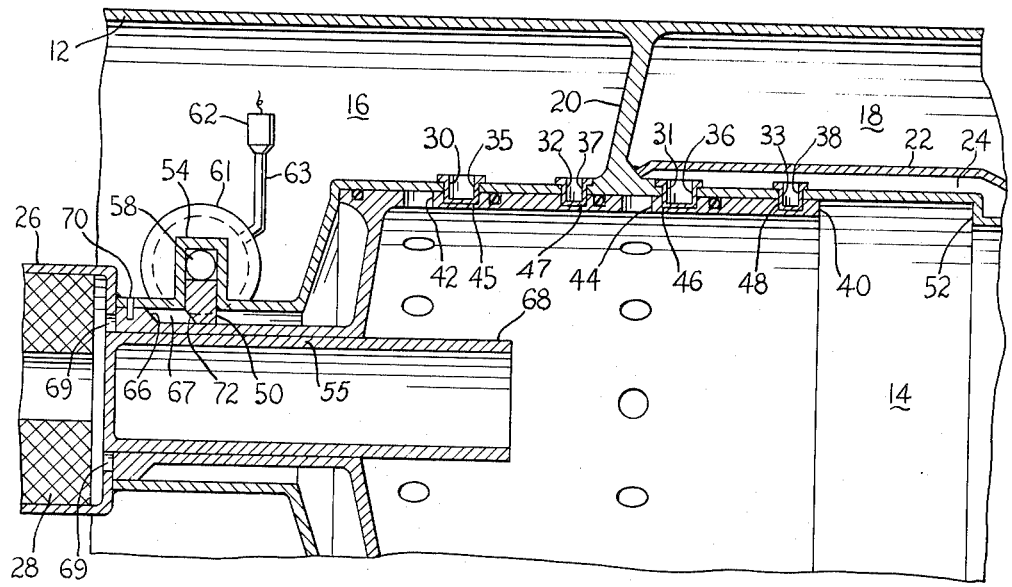
FIGURE 1 is a central, longitudinal, sectional, fragmentary view of a liquid bipropellant rocket powerplant embodying the invention showing its shear slide in the storage position.

Referring to the drawings, it will be apparent that the principles of the invention are as readily applicable to a monopropellant rocket powerplant as well as to the bipropellant one disclosed which includes an outer shell 12, a centrally positioned, longitudinally extending thrust chamber 14 terminating in an exhaust nozzle (not shown), both being defined by an inner shell 15 which, with the outer shell 12 defines oxidizer and fuel tanks 16 and 18 respectively which are separated by an annular bulkhead 20.

The thrust chamber 14 may be regeneratively cooled if desired by the provision of a circular baffle 22 spaced from the inner shell and the aft end to define a cooled fuel passage 24. The oxidizer and fuel in the tanks 16 and 18 are suitably pressurized upon operation of the powerplant by pressure gases conducted thereto by conduits (not shown) from a gas generating chamber 26 containing a solid grain propellant 28 and igniter which may be electrically activated to initiate operation.

Passage of oxidizer and fuel under pressure from their respective tanks 16, 18 to the thrust chamber 14 is by way of large circumferentially spaced oxidizer and fuel "boost" level ports or orifices 30 and 31 and smaller "sustain" level orifices 32 and 33 spaced axially aft thereof, which are respectively sealed by shear cups 35, 36, 37 and 38.

Figure 2:
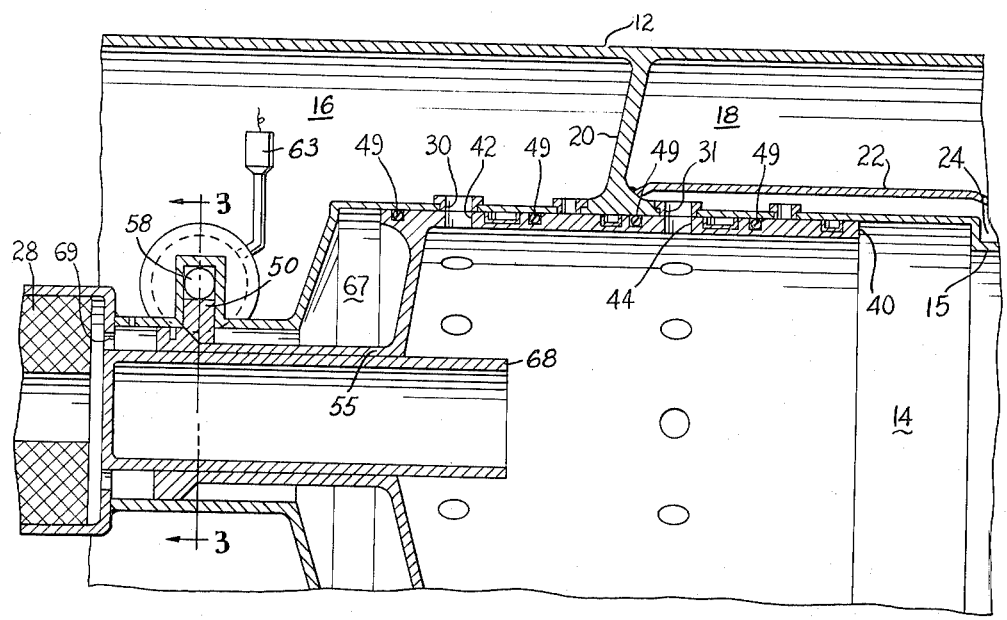
FIGURE 2 is a similar view showing the shear slide in its second or "boost" level thrust position.

A cylindrical shear slide 40 is mounted for axial movement in the thrust chamber 14 and is provided with large circumferentially spaced, oxidizer and fuel, "boost" level inlet ports or orifices 42 and 44 adapted to be aligned with the tank inlet ports 30 and 31 when the slide 40 moves from the storage position of FIGURE 1 to the "boost" level thrust position of FIGURE 2 as limited by the stop 50 to be described. Upon retraction of the stop 50, the slide 40 moves to a position against the stop 52 formed by a shoulder of the inner shell 15, and the slide ports 42 and 44 are then aligned with the "sustain" level tank oxidizer and fuel ports 32 and 33 respectively.

It will be noted that in the storage position of FIGURE 1, the shear cups 35, 36, 37 and 38 are respectively seated in and supported by a plurality of circumferentially spaced circular recesses 45, 46, 47 and 48 formed in the shear slide 40 which function, upon movement of the slide from its first position of FIGURE 1 to its second (or next to last) position of FIGURE 2, to shear off the cups 35–38 to permit propellant flow through aligned ports. Axial leakage between the various ports is prevented by the use of O-rings 49.

Figure 3:
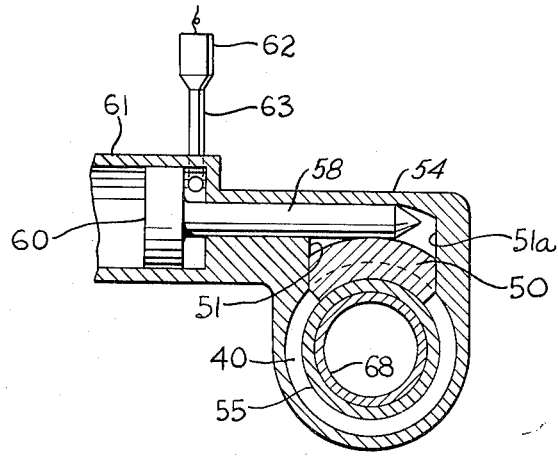
FIGURE 3 is a transverse, sectional view thereof taken on the line 3—3 of FIGURE 2.

The forward end of the inner shell 15 is provided with an arcuate housing 54 having a radial opening 56 into the thrust chamber 14 for the reception of the sector shaped stop 50 which is positioned by a pair of locating pins 51 and held against a reduced forward portion 55 of the slide 40 by a detent 58 acting against its outer face. The detent is connected to a piston 60 movable in a cylinder 61 under gas pressure toward the left as seen in FIGURE 3 to withdraw the detent 58 from the housing 54 and permit radially outward movement of the sector shaped stop 50 under the force exerted by the slide. The gas pressure is generated by a squib 62 which is ignited upon electrical signal and delivers pressure gases to the cylinder 61 by way of conduit 63.

The forward end of the slide 40 terminates in a peripheral flange 65 having a tapered aft surface 66, and is movable in a chamber 67 defined by the forward portion of the inner shell 15 and a centrally positioned shell 68 fixed to the generator chamber 26 which communicates with the chamber 67 by a plurality of circumferentially spaced ports 69 through which pressure gases act on the slide to move it from the first or storage position where it is retained by shear pins 70 to the second and third positions.

It will be noted that the forward face 72 of the portion of the ring sector stop 50 which projects within the thrust chamber is also tapered at the same angle as the flange taper 66 so that gas pressure acting on the slide flange 65 in position 2 (FIGURE 2) acts by means of the taper 66 to urge the sector stop outwardly but is prevented by the detent 58. Obviously, the angle of the tapered surfaces 66 and 72 may be adjusted so as to be in conformance wtih the force available (gas pressure) to move the sector stop outwardly when the detent is removed.

In the operation of the powerplant, the grain in the gas generator is ignited and the generated gases pressurize the propellant tanks 16, 18 and act upon the slide flange 65 so that upon attaining a given pressure almost immediately, the shear pins 70 are sheared and the shear slide 40 is moved from the storage or first position of FIGURE 1 to the second or "boost" level thrust position of FIGURES 2 and 3 against the sector stop 50. Such movement shears the sealing cups 35, 36, 37 and 38 and slide ports 42 and 44 are aligned with tank ports 30 and 31 respectively to permit the pressurized propellants to enter the thrust chamber 14.

Figure 4:
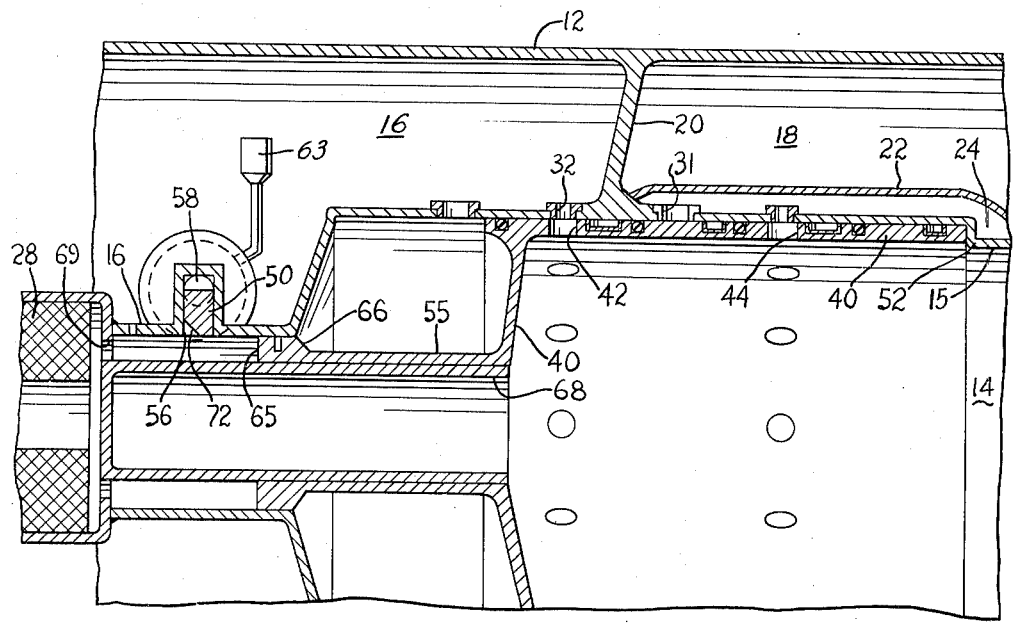
FIGURE 4 is a view similar to FIGURES 1 and 2 but with the shear slide in its third or "sustain" level position.

Upon the conclusion of "boost" level thrust, the squib 62 is ignited and the resultant gases act on the piston 60 to move the detent 58 to the left. The slide flange 65 acting under the gas pressure and by means of the tapered faces 66 and 72, now forces the sector stop 50 outwardly into the area vacated by the detent 58 and the slide 40 then moves to the third or "sustain" level thrust position of FIGURE 4 where it is stopped by the thrust chamber shoulder 52. The shear slide ports 42 and 44 are now aligned with the smaller tankage ports 32 and 33.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. In combination, a liquid propellant rocket powerplant having a thrust chamber terminating in an exhaust nozzle, propellant tankage including large and small ports communicating with said chamber, a slide including a flange and a large port slidably mounted in said chamber for movement from a first position to a second and third position to control the flow of propellant into said chamber, a stop projecting into said chamber to engage said slide flange and stop said slide in said second position with said large slide port in alignment with said first-mentioned large port, and means associated with said stop and operative to effect retraction of said stop by said flange to permit movement of said slide to said third position with said large slide port in alignment with said small port.

2. The combination recited in claim 1 wherein the engaged faces of said flange and said stop are tapered.

3. The combination recited in claim 1 wherein said associated means comprises a detent preventing retraction of said stop, and means for moving said detent to permit said retraction.

4. The combination recited in claim 1 wherein said stop is sector shaped to engage an extended portion of the periphery of said slide flange.

5. The combination recited in claim 3 wherein said detent moving means comprises a pressure operated piston connected to said detent.

6. In combination with a liquid propellant rocket powerplant including a combustion chamber terminating in a nozzle and propellant tankage including large and small ports communicating with said chamber; shear cups sealing said ports, a shear slide having a large port and including a flange mounted in said chamber and axially movable from a first position to a second to shear said cups, and to a third position to control the flow of propellant from said tankage into said chamber, a stop projecting into said chamber to engage said shear slide flange and stop said slide after shearing said cups in said second position with said large slide port in alignment with said first-mentioned large port, and means associated with said stop and operative to effect retraction of said stop by said flange to permit movement of said slide to said third position with said large slide port in alignment with said small port.

7. The combination recited in claim 6 wherein the engaged faces of said flange and said stop are tapered.

References Cited by the Examiner

UNITED STATES PATENTS

| | | | |
|---|---|---|---|
| 2,813,518 | 11/1957 | Driskel et al. | 92—24 X |
| 2,954,670 | 10/1960 | Helus et al. | 60—35.6 X |
| 2,971,497 | 2/1961 | De Vost | 92—24 |
| 2,992,528 | 7/1961 | Ozanich et al. | 60—35.6 |
| 3,106,060 | 10/1963 | Comer | 60—35.6 |

FOREIGN PATENTS 573,033  11/1945  Great Britain.

MARK NEWMAN, *Primary Examiner.*

SAMUEL LEVINE, *Examiner.*